United States Patent
Gurvich et al.

(10) Patent No.: US 12,372,180 B2
(45) Date of Patent: Jul. 29, 2025

(54) SELF-LOCKING COMPOSITE-COMPOSITE JOINTS

(71) Applicant: Goodrich Corporation, Charlotte, NC (US)

(72) Inventors: Mark R. Gurvich, Middletown, CT (US); Kevin P. Walsh, Enfield, CT (US); Michael Maynard, Somers, CT (US); Kenneth C. Crawford, Manchester, CT (US)

(73) Assignee: Goodrich Corporation, Charlotte, NC (US)

( * ) Notice: Subject to any disclaimer, the term of this patent is extended or adjusted under 35 U.S.C. 154(b) by 112 days.

(21) Appl. No.: 18/140,838

(22) Filed: Apr. 28, 2023

(65) Prior Publication Data

US 2024/0360934 A1  Oct. 31, 2024

(51) Int. Cl.
*F16L 37/084* (2006.01)

(52) U.S. Cl.
CPC .................. *F16L 37/084* (2013.01)

(58) Field of Classification Search
CPC ..... F16L 25/0018; F16L 47/20; F16L 37/084; Y10T 403/7045
USPC ........................................................ 285/330
See application file for complete search history.

(56) References Cited

U.S. PATENT DOCUMENTS

| | | | |
|---|---|---|---|
| 2,195,492 A * | 4/1940 | Mcdonald | F16L 37/54 285/330 |
| 2,204,103 A | 6/1940 | Lampkin | |
| 2,297,390 A | 9/1942 | Peter | |
| 3,104,896 A * | 9/1963 | Kennedy, Jr. | F16L 37/248 |
| 4,435,104 A * | 3/1984 | Held | E06B 3/984 403/364 |
| 4,512,596 A * | 4/1985 | Obrecht | F16D 1/02 285/330 |
| 5,086,854 A * | 2/1992 | Roussy | E21B 17/042 285/330 |
| 5,269,572 A * | 12/1993 | Mefferd | F16L 21/06 285/330 |
| 6,352,385 B1 | 3/2002 | Wojciechowski et al. | |
| 8,161,619 B2 | 4/2012 | Wanthal | |
| 10,180,153 B2 | 1/2019 | Burns | |
| 2011/0227331 A1 | 9/2011 | Church | |

FOREIGN PATENT DOCUMENTS

EP    0770809 B1    4/2001

OTHER PUBLICATIONS

Extended European Search Report for EP Application No. 24168845.6, dated Oct. 29, 2024, 10 pages.

* cited by examiner

Primary Examiner — Zachary T Dragicevich
(74) Attorney, Agent, or Firm — Kinney & Lange, P.A.

(57) ABSTRACT

A fastener free joining system includes a first tubular shell component having a first plurality of teeth defined in a first free end, each tooth extending along a respective tooth axis oblique to an axis of the first component by an angle α. The first plurality of teeth is configured to engage with a plurality of complimentary teeth defined in a second free end of a second tubular shell component, such that, when engaged, the first plurality of teeth is configured to remain engaged with the plurality of complimentary teeth under axial load.

16 Claims, 10 Drawing Sheets

SELF-LOCKING COMPOSITE-COMPOSITE JOINTS

TECHNICAL FIELD

The present disclosure relates to composite joints and more particularly to self-locking composite-composite joints for tubular components.

BACKGROUND

For weight and performance benefits, aircraft water collectors are often fabricated with composite shells as separate tubular-type segments with follow-up joining. The composite shells are typically polymer-matrix composites with or without fiber reinforcement. The fiber can be usually short, randomly distributed fiber segments or, in some cases, complimented by continuous long fibers. The segments can have non-uniform diameters along their axes for efficient installation of internal components. Their axial cross-sections can also have linear or curved profiles to optimize system-level performance of water collectors. The most typical load conditions are internal pressure, generating both radial expansion and axial tension. Thus, joining solutions between separate segments should be strong enough to perform such local load transfers and, especially, the axial tension.

In conventional solutions for such joints, the load transfer is based on adhesion between connected segments and radially-positioned metallic fasteners. However, radial fasteners through thickness of composite shells can cause significant stress concentrations in the composite parts, with corresponding increased risks of their damage. In addition, the fasteners can, in some cases, increase risks of leakage and/or generate additional challenges with smoothness of internal surfaces, needed for successful performance of internal flow.

The conventional techniques have been considered satisfactory for their intended purpose. However, there is an ever present need for improved designs and methods of fabrication/installation for joints between pipe-type composite segments, providing sufficient resistance to both radial and axial expansions. This disclosure provides a solution for this need.

SUMMARY

In accordance with at least one aspect of this disclosure, a fastener free joining system, includes, a first tubular shell-type component having a first plurality of teeth defined in a first free end, each tooth extending along a respective tooth axis oblique to an axis of the first component by an angle $\alpha$. The first plurality of teeth is configured to engage with a plurality of complimentary teeth defined in a second free end of a second tubular shell-type component, such that, when engaged, the first plurality of teeth is configured to remain engaged with the plurality of complimentary teeth under axial load.

In embodiments, the first plurality of teeth is configured to remain engaged with the plurality of complimentary teeth under purely axial tension (e.g., having no torsional component). In embodiments, the first plurality of teeth can be configured to remain engaged with the plurality of complimentary teeth under axial tension without a fastener or other adhesion means therebetween.

Each tooth of the first plurality of teeth can be oblique relative to the axis by an angle $\alpha$ to prevent disengagement of the first component from the second component under axial tension. In embodiments, the angle $\alpha$ between the respective tooth axis and the first component axis can be constant along a length of a respective tooth. In embodiments, the angle $\alpha$ between the respective tooth axis and the first component axis can be variable along a length of a respective tooth.

In embodiments, a geometry of each tooth can be uniform along a length of the tooth from a base of the tooth to a tip of the tooth (e.g., along the respective tooth axis). In embodiments, the geometry of each tooth can be non-uniform along a length of the tooth from a base of the tooth to a tip of the tooth (e.g., along the respective tooth axis). In certain embodiments, each tooth of the first plurality of teeth can be defined through an entire annular thickness of the first component. In certain embodiments, each tooth of the first plurality of teeth can be defined through only a portion of an annular thickness of the first component. In certain embodiments, the portion of the annular thickness of the first component can be an internal portion defined between an inner surface and an outer surface of the first component, or can be an outer portion (e.g., an upper or lower portion).

In accordance with at least one aspect of this disclosure, a system (e.g., a multi-pipe segment system) can employ the fastener free joining system as described herein. In certain embodiments, the system can be a water collector (e.g., for an aircraft). The system can include a first tubular component defining a first axis and having a first plurality of teeth defined in a first free end thereof, each tooth extending along a respective tooth axis angled oblique to the first axis by an angle $\alpha$. The system can include a second tubular component defining a second axis and having a second plurality of teeth defined in a second free end thereof each tooth extending along a respective tooth axis angled oblique to the second axis by the angle $\alpha$. The second plurality of teeth can be complimentary to the first plurality of teeth and configured to engage with the first plurality of teeth to join the first component and the second components coaxially to form a joint therebetween. When engaged, the first component and second components can be configured to remain engaged at the joint when the first and second component are under axial load.

In certain embodiments, the first component and/or the second component can be of a polymer or a fiber-reinforced polymer. In certain embodiments, the fiber reinforced polymer can be reinforced with any combination of short or continuous fibers. In certain embodiments, the contact surfaces between the first component and the second component can be joined by one or more of: adhesive or glue, co-curing (e.g., for thermoset polymers), or welding (e.g., for thermoplastic polymers).

In certain embodiments, the system can include a ring configured to interface with an outer surface of a portion of the first tubular component and an outer surface of a portion of the second tubular component at a location over the joint to provide contact pressure to the joint. In certain embodiments, at least the first component can include a first wedge portion (e.g., of linearly non-uniform diameter) defined in the outer surface and along a circumferential direction. In such embodiments, the ring can include a generally complimentary inner diameter profile configured to interface with the first wedge portion to provide contact pressure to the joint. In embodiments, the second component can also include a second wedge portion (e.g., of linearly non-uniform diameter) defined in the outer surface and along a circumferential direction, axially aligned with the first wedge portion of the first component to form a contiguous wedge structure. In such embodiments, the ring can include a generally complimentary inner diameter profile configured to interface with the contiguous wedge structure to provide contact pressure to the joint.

In certain embodiments, the first component can include a first wedge portion defined in the outer surface thereof and the second component can include a second wedge portion defined in the outer surface thereof facing opposite the first wedge portion to form a peak therebetween. In certain such embodiments, the ring can include a first ring portion having a complimentary inner diameter profile configured to interface with the first wedge portion and a second ring portion having a complimentary inner diameter configured to interface with the second wedge portion, the first and second ring portions configured to meet at the peak to provide contact pressure to the joint.

In accordance with at least one aspect of this disclosure, a method can include forming a first tubular component defining a first axis and having a first plurality of teeth defined in a first free end thereof, each tooth extending along a respective tooth axis angled oblique to the first axis by an angle α, forming a second tubular component defining a second axis and having a second plurality of teeth defined in a second free end thereof, each tooth extending along a respective tooth axis angled oblique to the second axis by the angle α, the second plurality of teeth complimentary to the first plurality of teeth, and engaging the first plurality of teeth with the second plurality of teeth to join the first component and the second component coaxially to form a joint therebetween such that, when engaged, the first component and second component remain engaged under axial tension.

In embodiments, the method can include, installing a ring on an outer surface of a portion of the first component and the second component at the joint to provide contact pressure to the joint. In embodiments, installing the ring can include thermally shrinking the first and second components before installing the ring and allowing the first and second components to thermally expand into the ring such that the ring provides contact pressure to the joint. In embodiments, installing the ring can include installing the ring on a wedge structure defined on at least one of the first and or second component. In certain embodiments, installing the ring can include installing a first ring portion over a first wedge structure defined in the first component and a second ring portion over a second wedge structure defined on the second component.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein.

DETAILED DESCRIPTION

Figure 1:
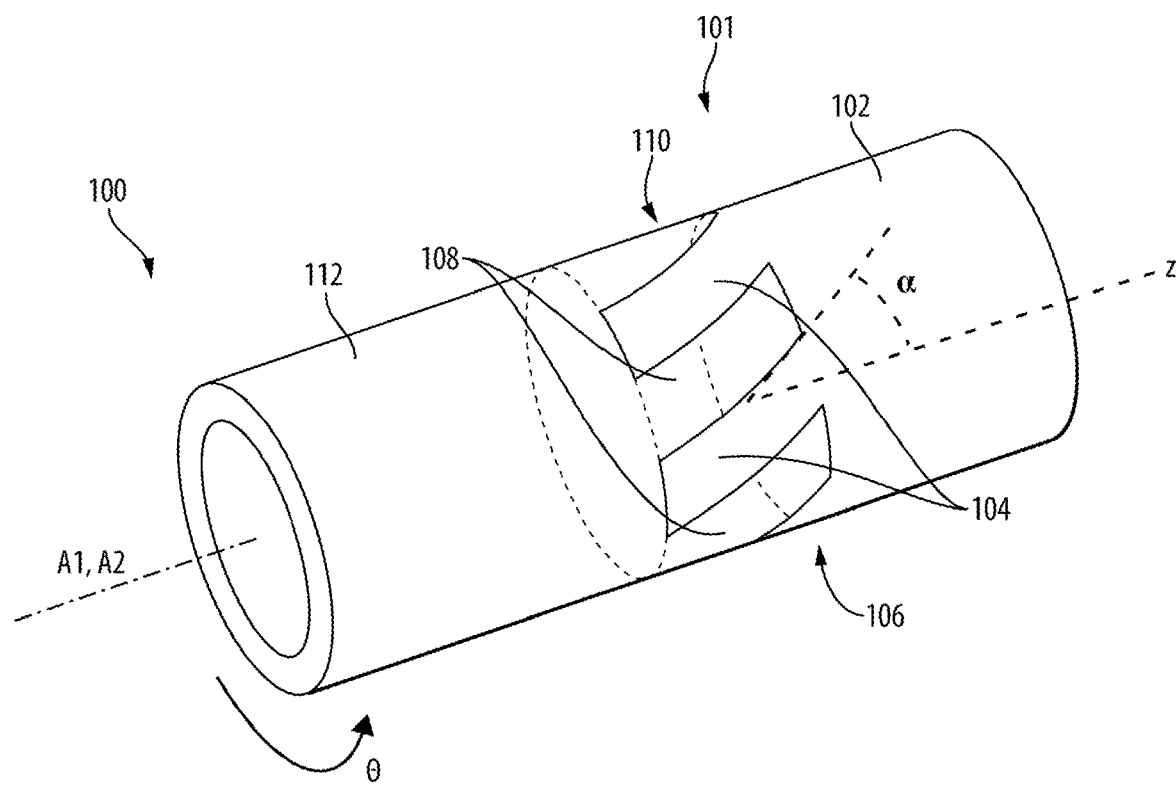
FIG. 1 is a perspective 3D schematic view of an embodiment of a joining system in accordance with this disclosure, showing a first and a second components joined together.
Figure 2:
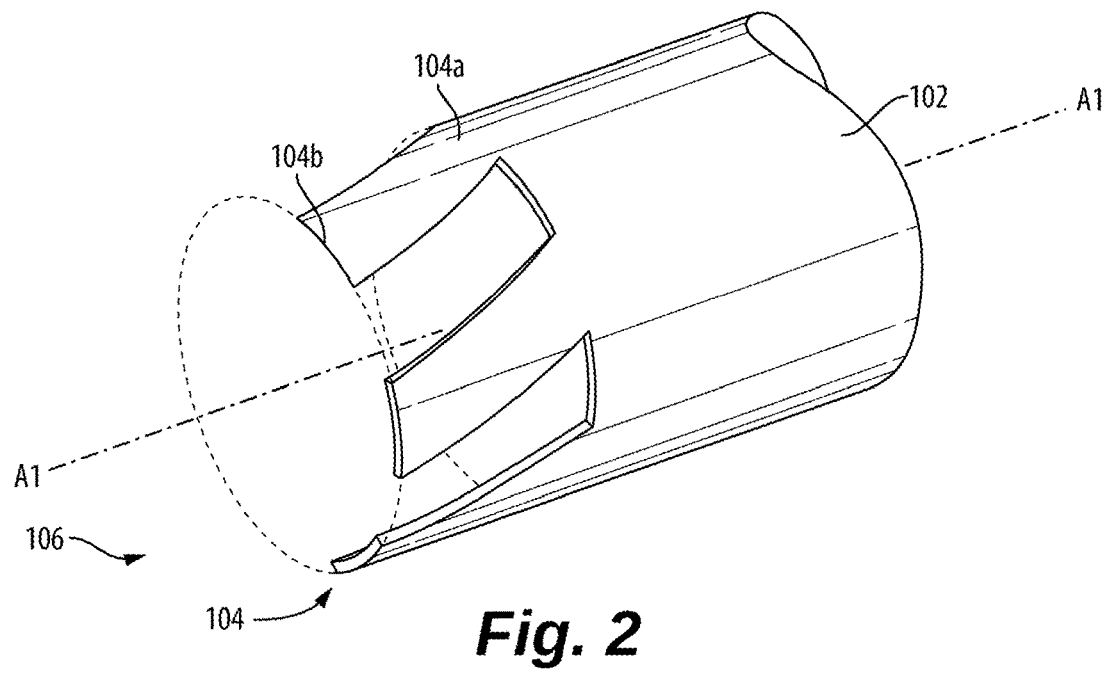
FIG. 2 is a perspective 3D schematic view of the system shown in FIG. 1, showing only the first component.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-12B. Certain embodiments described herein can be used to join two components together without a fastener.

With reference to FIGS. 1-5, in accordance with at least one aspect of this disclosure, a fastener free joining system 100, for joining one or more pipe-like structures 101, can include a first component 102 having a first plurality of teeth 104 defined in a first free end 106 and extending generally with some non-zero angle α with respect to axis A1 of the first component 102. The first plurality of teeth 104 can be configured to engage with a plurality of complimentary teeth 108 defined in a second free end of a second component 110, such that, when engaged (as shown in FIG. 1), the first plurality of teeth 104 are configured to remain engaged with the plurality of complimentary teeth 108 under axial load (e.g., a pulling apart of the first and the second components under tension). The second end 110 of the second component 112 can be identical to the first end 106 of the first component 102, even if main bodies portion of the first and second components are different (e.g., in size or shape).

Figure 3:
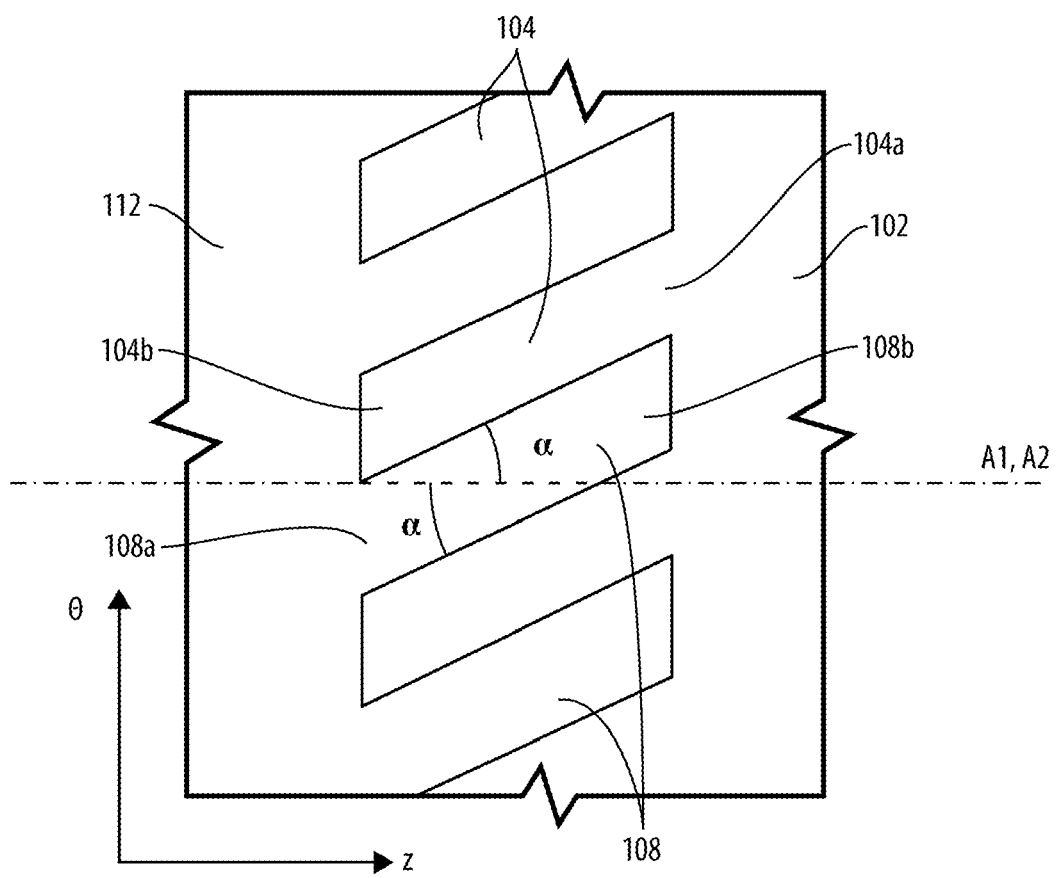
FIG. 3 is a partial 2D planar view of an embodiment the system of FIG. 1, showing mutual position of respective teeth of the first and the second components relative to an axis.
Figure 4:
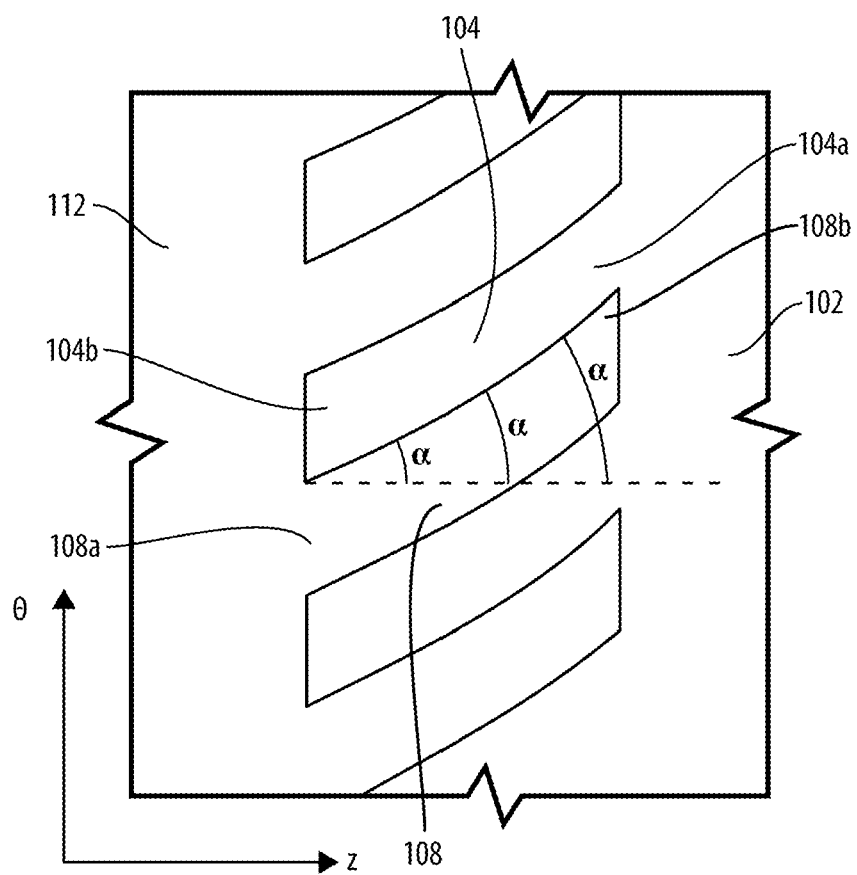
FIG. 4 is a 2D partial planar view an embodiment of the system of FIG. 1, showing another mutual position of respective teeth of the first and the second components relative to an axis.
Figure 5:
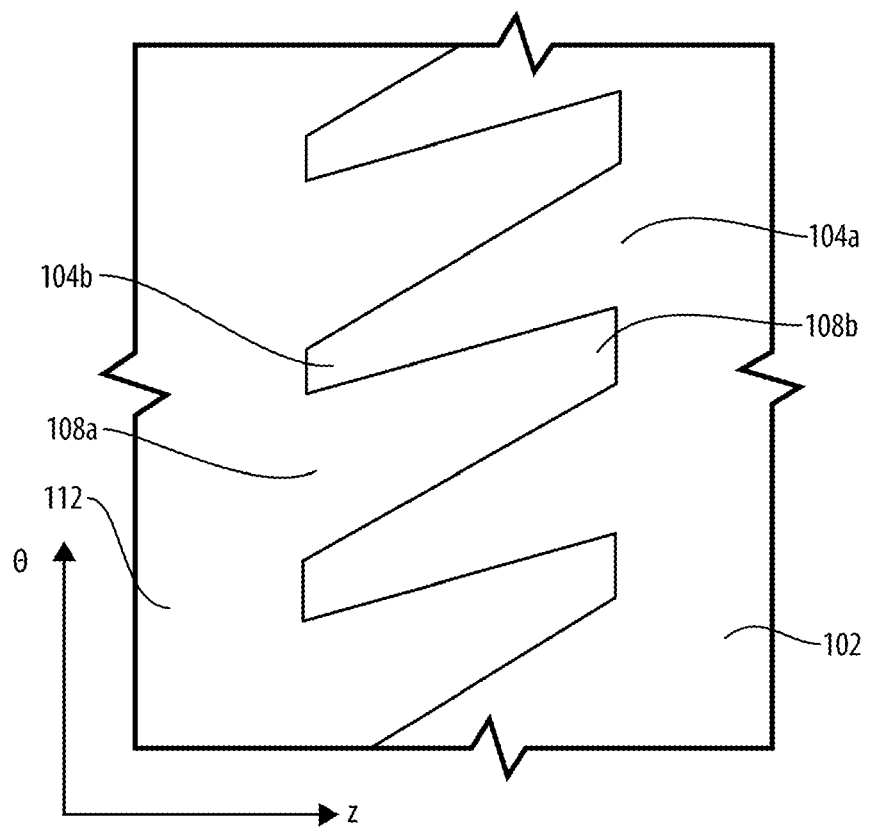
FIG. 5 is a 2D partial planar view an embodiment of the system of FIG. 1, showing another mutual position of respective teeth of the first and the second components.

In embodiments, the first plurality of teeth 104 are configured to remain engaged with the plurality of complimentary teeth 108 under purely axial load (e.g., having no rotational component) such that the first and the second components 102, 112 do not come apart when, for example, axial tension alone is applied. In embodiments, the first plurality of teeth 104 can be configured to remain engaged with the plurality of complimentary teeth 108 under axial tension and without a fastener or other adhesion means therebetween, Each tooth 104/108 can define a base 104a/108a and a tip 104b/108b. Each tooth 104/108 can be oblique relative to the axis A1/A2 by a non-zero angle α to prevent disengagement of the first component 102 from the second component 112 under axial tension. As shown, angling the tooth 104/108 relative to the axis A/A2 can mean the tip 104a/108a of each tooth 104/108 is clocked circumferentially relative to the base 104b/108b of the tooth 104/108. In embodiments, the angle α can be constant along a length of a respective tooth 104/108, e.g., from the base to the tip as shown in FIG. 3. Also shown in FIG. 3, in certain embodiments, a geometry of each tooth 104/108 can be uniform along the length of the tooth 104/108, e.g., from the base to the tip, where in FIG. 3, the geometry is rectangular, for example. In embodiments, the angle α can be variable along a length of a respective tooth 104/108, e.g., from the base to the tip as shown in FIG. 4, where three angles are used. In certain embodiments, the geometry of each tooth 104/108 can be non-uniform along a length of the tooth, e.g., from the base to the tip as shown in FIG. 5, where the geometry is trapezoidal, for example having a variable width along the length of the tooth 104/108, where the width of the tooth is bigger at the base than at the tip. Any suitable combination of constant or variable orientation relative to the axis and/or constant or variable geometry is contemplated herein.

Although embodiments shown in FIGS. 1-5 are illustrated on examples of tooth orientations directed clock-wise circumferentially relative to the axis A1, A2, other embodiments can be similarly implemented with counter-clockwise circumferential orientations.

Figure 6:
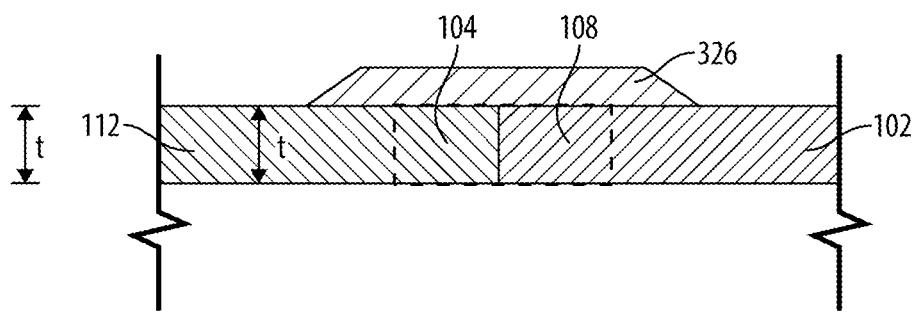
FIG. 6 is axial cross-section of an embodiment of the system of FIG. 1, showing a respective portion of radial thickness of the first and the second components in which the respective teeth are defined.
Figure 6A:
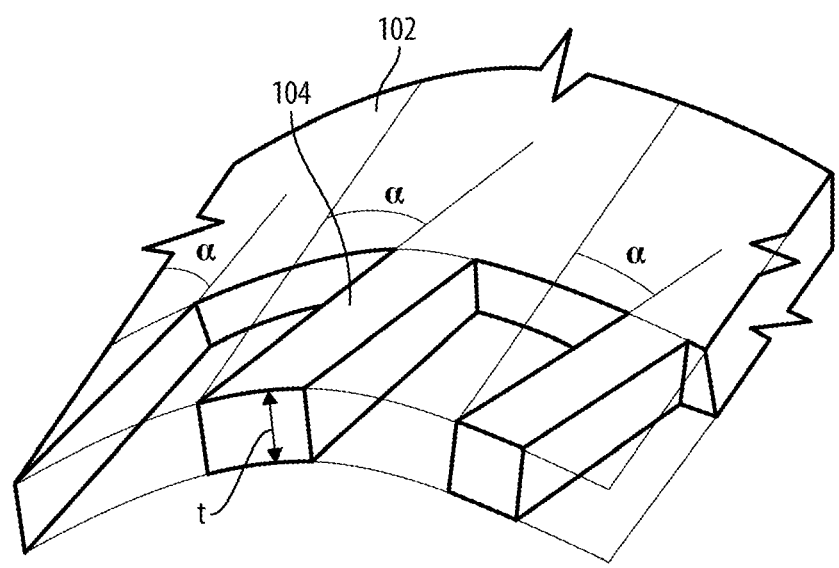
FIG. 6A is front end partial perspective view of the first component of FIG. 6.
Figure 7:
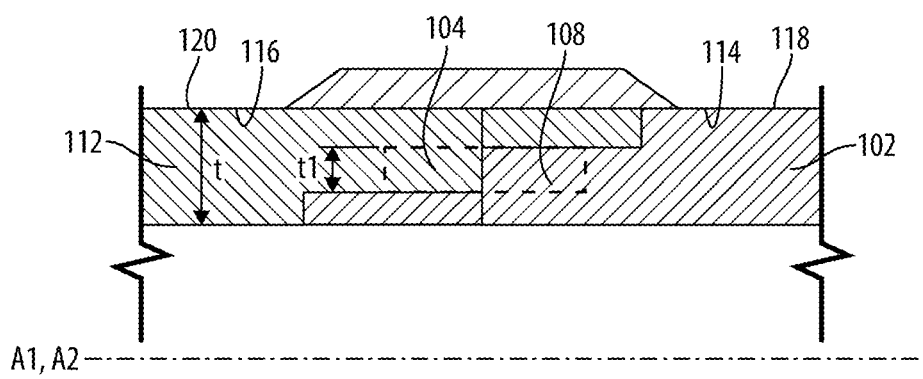
FIG. 7 is an axial cross-section of an embodiment of the system of FIG. 1, showing another respective portion of radial thickness of the first and the second components in which the respective teeth are defined.
Figure 7A:
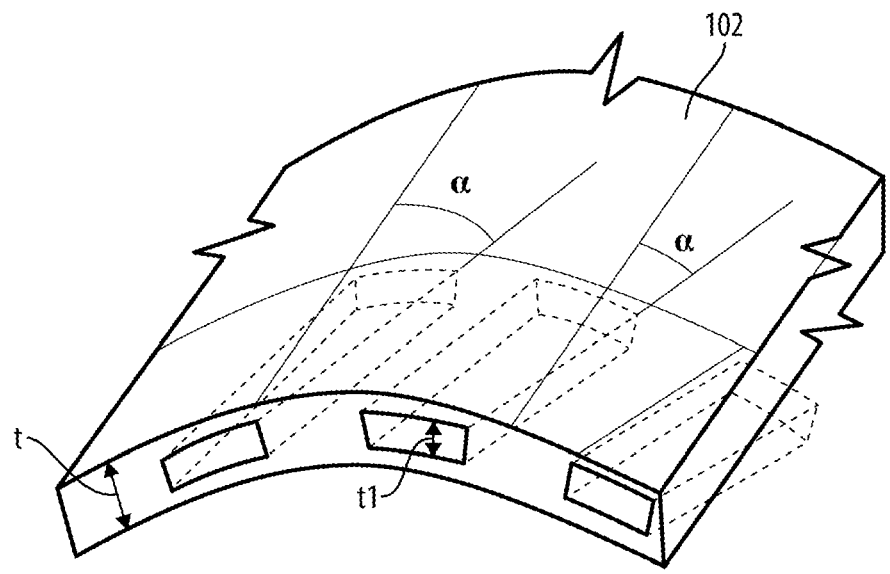
FIG. 7A is front end partial perspective view of the first component of FIG. 7.
Figure 8:
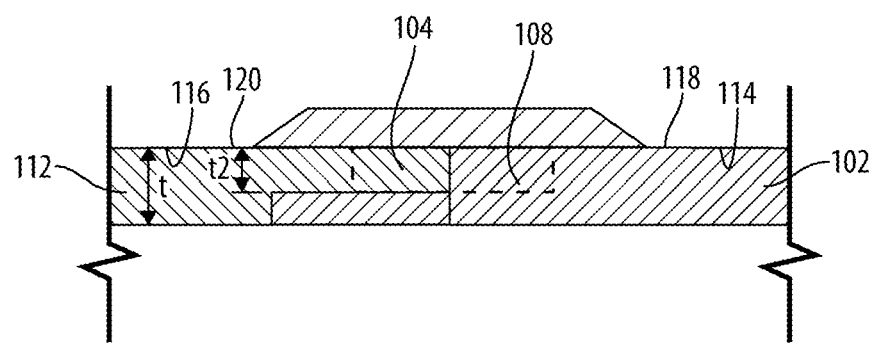
FIG. 8 is an axial cross-section of an embodiment of the system of FIG. 1, showing another respective portion of radial thickness of the first and the second components in which the respective teeth are defined.
Figure 8A:
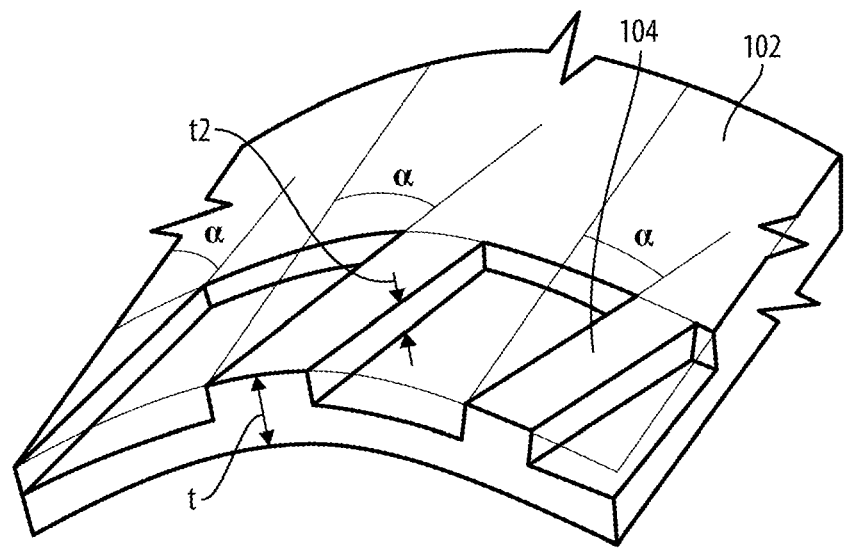
FIG. 8A is front end partial perspective view of the first component of FIG. 8.

With reference now to FIGS. 6-8A, in certain embodiments, each tooth 104/108 can be defined through an entire radial thickness "t" of the respective component 102/112, e.g., as shown in FIGS. 6 and 6A. In certain embodiments, each tooth 104/108 can be defined through only a portion of a radial thickness of the respective component 102/112, for example, the portion "t1" of the annular thickness "t" can be an internal portion defined between an inner surface 114/116 and an outer surface 118/120 of the respective component 102/112, as shown in FIGS. 7 and 7A. Here, the teeth 104/108 can be considered similar to a conventional mortise and tenon joint, however, with an important difference. In contrast with conventional mortise and tension joints, where the teeth are perpendicular to the end surface, embodiments shown in FIGS. 7 and 7A have teeth positioned under non-zero angle α to provide restriction to potential axial movement even without any adhesion or friction. In certain embodiments, each tooth 104/108 can be defined in a portion "t2" of the radial thickness "t", wherein the portion "t2" is an upper or lower portion as shown in FIGS. 8 and 8A.

Figure 9:
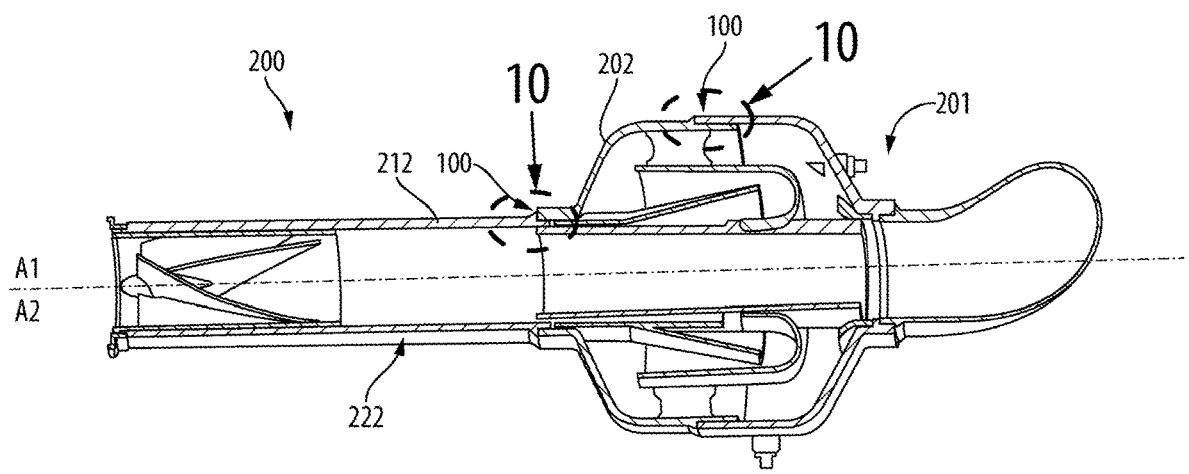
FIG. 9 is an axial cross-section of a representative aircraft water collector system, showing one or more joints employing an embodiment of the joining system of FIG. 1.
Figure 10:
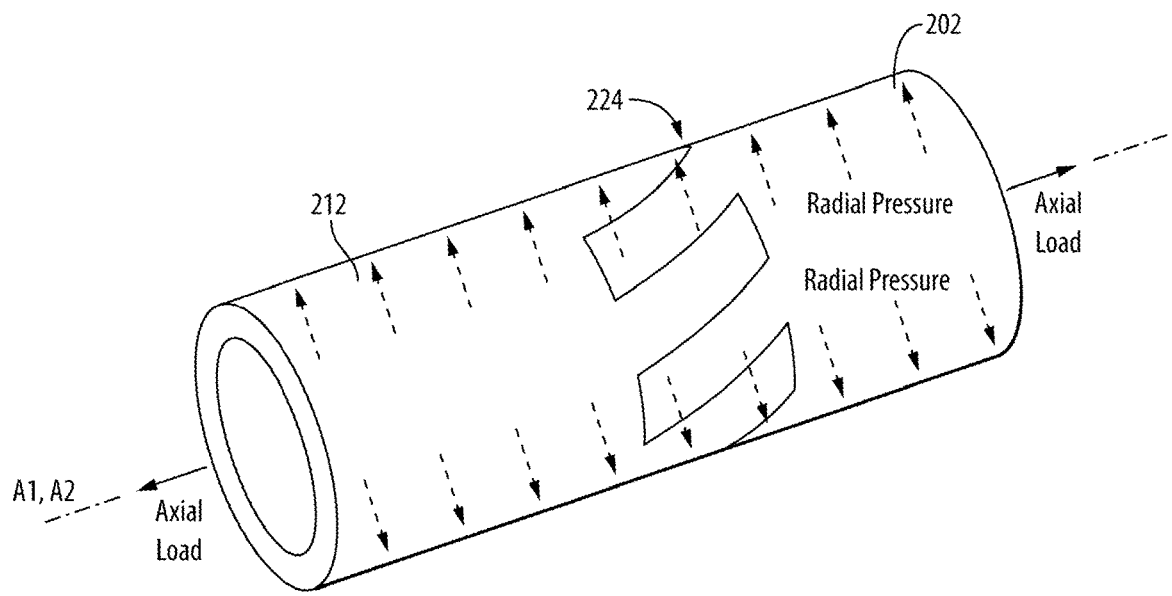
FIG. 10 is an enlarged partial schematic view of a respective joint of FIG. 9, shown as an axial cross-section and illustrating one or more forces acting on the joint.

With reference now to FIGS. 9 and 10, in accordance with at least one aspect of this disclosure, a system 200 (e.g., a multi-segment pipe system such as shown in FIG. 9) can employ the fastener free joining system 100 as described hereinabove when joining the pipe segments 201 together. In certain embodiments, the system 200 can be an aircraft water collector 222, and the pipe segments 201 can form a composite shell of the water collector 222. The system 200 can include a first tubular component 202, e.g., as described above, and at least a second tubular component 212. The second tubular component 212 can be similar to the first tubular component 201, defining a second axis A2 and having a second plurality of teeth defined in a second free end thereof oblique to the second axis by the angle α, as described above with respect to the second component 112 referencing FIGS. 1-5.

When engaged (e.g., installed in the system 200 to form at least one joint 224), the first component 202 and second component 212, are configured to remain engaged at the joint 224 when the first and second component 202, 212 are under axial load. In the example of a water collector 222, a fluid, e.g., air and/or water, may be flowing through the first and the second components 202, 212 and exerting a radial pressure on the joint 224, as shown in FIG. 10. The joint 224 is configured to remain engaged under axial load while still providing resistance against the radial forces acting on the joint 224 by the fluid flowing within the component(s). Having no radially extending fastener at the joint 224 allows any fluid flowing within the components to maintain a smooth flow.

In certain embodiments, an external reinforcing ring 326 can be included to provide a contact pressure to the joint 224, wherein the external ring does not extend into the pipe segment formed by the first and second tubular components. Certain embodiments can include an adhesion means to adhere the ring to the first and second components 202, 212, however, the system 100/200 and ring 326 are configured and adapted for use without any adhesion means or fasteners (e.g., radial fasteners) to join the first and second components 202, 212 together.

In embodiments, the ring 326 can be configured to interface with the outer surface 218 of a portion of the first component 202 and the outer surface 220 of a portion of the second component 212 at a location 228 over the joint 224, for example as shown in FIGS. 6-8.

Figure 11A:
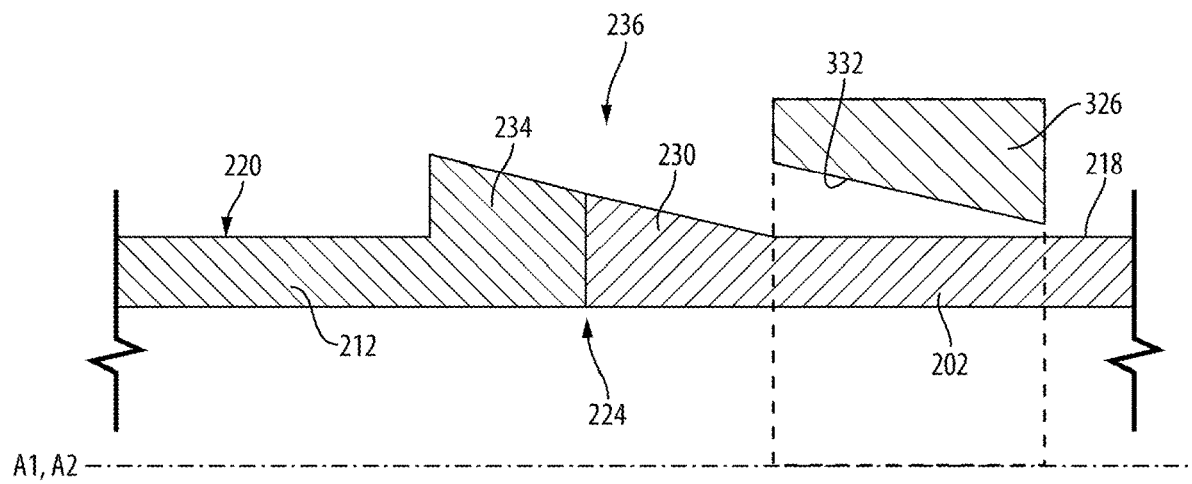
FIGS. 11A and 11B are axial cross-sections of an embodiment of the system of FIG. 1, showing a pre-installation (FIG. 11A) and a final (installed) position (FIG. 11B) of a circumferential ring over the joint.
Figure 11B:
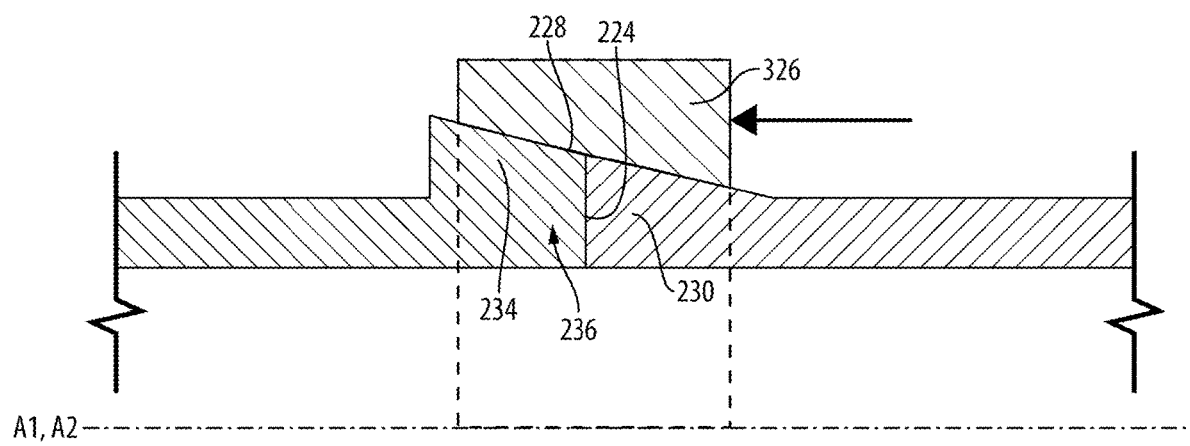

In certain embodiments, for example as shown in FIGS. 11A and 11B, at least the first component 202 can include a first wedge portion 230 defined in the outer surface 218. In such embodiments, the ring 326 can include a generally complimentary inner diameter 332 configured to interface with the first wedge portion 230. In embodiments, the second component 212 can also include a second wedge portion 234 defined in the outer surface 220 axially aligned with the first wedge portion of the first component to form a contiguous wedge structure 236. In such embodiments, the ring 326 can include a generally complimentary inner diameter 332 configured to interface with the contiguous wedge structure 236, for example as shown in FIG. 11B. In embodiments shown in FIGS. 11A-B, the wedge portions can be defined as axi-symmetric parts with linear variation of non-uniform diameter with respect to the axis, generating a linear profile in corresponding axial cross-sections.

Figure 12A:
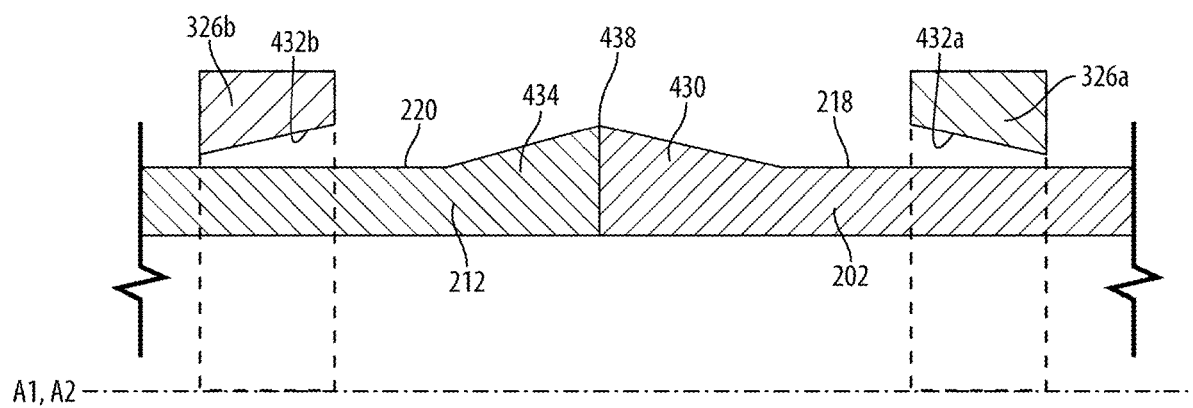
FIGS. 12A and 12B are axial cross-sections of an embodiment of the system of FIG. 1, showing a pre-installation (FIG. 12A) and a final (installed) position (FIG. 12B) of other circumferential rings over the joint.
Figure 12B:
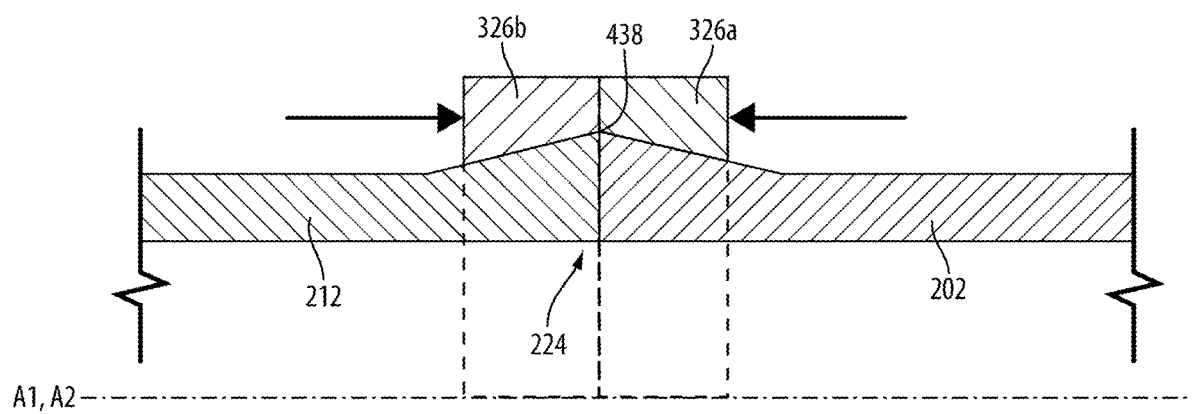

In certain embodiments, for example as shown in FIGS. 12A and 12B, the first component 202 can include a first wedge portion 430 defined in the outer surface 218 thereof and the second component 212 can include a second wedge portion 434 defined in the outer surface 220 thereof facing opposite the first wedge portion 430 to form a peak 438 therebetween. In certain such embodiments, the ring 326 can include a first ring portion 326a having a generally complimentary inner diameter 432a configured to interface with the first wedge portion 430 and a second ring portion 326b having a complimentary inner diameter 432b configured to interface with the second wedge portion 434, the first and second ring portions 326a, 326n configured to meet at the peak 438. Similarly, in embodiments shown in FIGS. 12A-B, the wedge portions can be defined as axi-symmetric parts with linear variation of non-uniform diameter with respect to the axis, generating a linear profile in corresponding axial cross-sections.

In accordance with at least one aspect of this disclosure, a method (e.g., a method of joining the first and second components 102, 112/202, 212) can include forming a first component 102/202 defining a first axis A1 and having a first plurality of teeth 104 defined in a first free end thereof, the teeth 104 oriented oblique to the first axis by an angle α. The method can include forming a second component 112/212 defining a second axis A2 and having a second plurality of teeth 108 defined in a second free end thereof, the teeth 108 oriented oblique to the second axis by the angle α, and the second plurality of teeth 108 being complimentary to the first plurality of teeth 104. The method can further include engaging the first plurality of teeth with the second plurality of teeth to join the first component and the second component coaxially, along axes A1/A2 to form a joint 224 therebetween such that, when engaged, the first component and second component remain engaged under axial tension. Engaging the teeth can include pushing the components together axially while also twisting the components relative to one another.

In embodiments, the method can include, installing a ring 326 on an outer surface of a portion of the first component and the second component at the joint to provide contact pressure to the joint 224 (e.g., as shown in FIGS. 6-8). In embodiments, installing the ring can include thermally shrinking the first and second components before installing the ring and allowing the first and second components to thermally expand into the ring such that the ring provides contact pressure to the joint. In embodiments, as shown in FIGS. 11A and 11B, installing the ring can include installing the ring on a wedge structure defined on at least one of the first and or second component. In certain embodiments, as shown in FIGS. 12A and 12B, installing the ring can include installing a first ring portion over a first wedge structure defined in the first component and a second ring portion over a second wedge structure defined on the second component.

Embodiments allow for fastener-free joints between pipe-type composite segments, providing sufficient resistance to both radial and axial expansions expected in typical implementations of water collectors, for example. As described herein, a joining system can include a connection of two composite pipe ends is designed with interconnected teeth, oriented with non-zero angle α with respect to axial position z (e.g., as shown in FIGS. 3-5). In embodiments, the teeth can be distributed along the hoop direction (e.g., circumferential) with complimentary in-plane mutual shapes. In embodiments, different geometries of the complimentary shapes for the teeth can be used, as long as they provide self-locking reaction in a case of axial load (e.g., axial tension) based on their non-zero orientation a.

In certain embodiments, the interconnected teeth can contact each other through the entire annular thickness (e.g., FIGS. 6 and 6A), a middle part of the annular thickness (e.g., FIGS. 7 and 7A), or a partial internal or external thickness (e.g., FIGS. 8 and 8A).

In embodiments, all or partial contact areas between connected pipe ends can have a) mutual adhesion, b) be welded in case of thermoplastic composites, or c) co-cured in case of thermoset composites, but all without requiring a fastener to extend between overlapping portions of the pipes at the joint. In certain embodiments, an external ring can be added to a) apply additional pressure in the radial direction and/or b) increase adhesive/welded contact areas (e.g., as shown in FIGS. 6, 7, and 8 and 11A-12B). In certain embodiments, the joint area can have a single (FIGS. 11A and 11B) or double (e.g., FIGS. 12A and 12B) tapered cross-sectional geometry for a more robust (e.g., pre-stressed) connection with the external ring.

In embodiments, the materials of the composite pipes and the external ring can be or include polymer-matrix fiber-reinforced composites with either short fiber reinforcement or/and long continuous fibers. Uni-directional continuous reinforcement in the hoop direction can be especially beneficial for the rings shown in FIGS. 6, 7, 8, 11, and 12, if included. In different embodiments, polymer matrix can be, for example, either thermoplastics or thermoset. Also, in embodiments, reinforcing fibers can be any combinations of, for example, carbon, glass or organic (e.g., Kevlar) fibers.

In embodiments, methods of making the components 102/202, 112/212, upon connection, opposite pipe ends are "twisted" relative to each other upon installation. In order to actually engage the respective teeth of the components, the components are moved both axially and rotationally to fit into place. This prevents disengagement of the components from one another when under axial load, where no twisting motion is applied. The larger the angle α is the more difficult it is to separate the components under axial load.

In embodiments that including the additional ring, upon installation of external ring(s) with sloped contact surface, the ring(s) can be forced in the axial direction until connection with complimentary sloped surface(s) of external surfaces of the pipes (e.g., FIGS. 11A-12B), which can generate a wedge effect for additional pressure on the joint in the radial direction, opposite the radial pressures inside the components.

In embodiments, installing the first component and the second component together and the ring, if applicable, corresponding contact surfaces can be additionally strengthened. Methods to make the contacts stronger can include application of adhesion or glue, co-solidifying in case of thermoplastics, different types of welding applicable for thermoplastics and co-curing for thermosets, depending on the respective materials used to form the components and the rings.

In embodiments having a flat-shaped ring (e.g., FIGS. 6, 7, and 8), the ring can be installed by any applicable methods, for example, by wrapping in the hoop direction of uni-directionally reinforced composites around joined composite pipe ends.

In other embodiments for a flat-shaped ring (FIGS. 6, 7, and 8), its installation can include creating first a ring with circumferential fiber reinforcement to handle potential radial expansion and then installing it by applying low temperature (e.g., liquid Nitrogen) to reduce temporary radial sizes of the components during installation for easy axial movement of the ring. Finally, upon to return to the room temperature, the components will expand diametrically back to the original dimensions providing a reliable close contact with the ring.

Embodiments described herein include a self-locking design(s) which can make water collectors more reliable, since because embodiments reduce the need for adhesion, which has a higher sensitivity to environmental conditions and can degrade over time.

Embodiments include a fastener-free composite/composite joints for composite water collectors which can following benefits: a) reduced risk of damage due to eliminated stress concentrations around fasteners; b) reduced risk of leakage; and c) enhanced smoothness of internal surface for improved flow.

While embodiments of the fastener free joining system are described herein with respect to use in a water collector, one having ordinary skill in the art having the benefit of this disclosure would readily appreciate that embodiments of the fastener free joining system can be applied to any suitable structure where composite pipe-type components are to be joined for reliable load transfer.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A fastener free joining system, comprising:
a first polymer-based tubular component defining a first axis and having a first plurality of teeth defined in a first free end thereof, each tooth extending along a respective tooth axis angled oblique to the first axis by an angle $\alpha$;
a second polymer-based tubular component defining a second axis and having a second plurality of teeth defined in a second free end thereof, each tooth extending along a respective tooth axis angled oblique to the second axis by the angle $\alpha$,
wherein the second plurality of teeth are complementary to the first plurality of teeth and configured to engage with the first plurality of teeth to join the first component and the second components coaxially to form a joint therebetween such that, when engaged, the first component and second component remain engaged under tensile axial load; and
an external ring configured to interface with an outer surface of a portion of the first tubular component and an outer surface of a portion of the second tubular component at a location over the joint;
wherein at least the first component further includes a first wedge portion defined on the outer surface, the first wedge portion defined by a linearly non-uniform diameter, and wherein the ring includes a generally complementary inner diameter profile configured to interface with the first wedge portion to provide contact pressure to the joint.

2. The system of claim 1, wherein the first component and/or the second component is a fiber-reinforced polymer-matrix composite.

3. The system of claim 2, wherein contact surfaces of the first plurality of teeth and the second plurality of teeth are joined by one or more of: adhesive, co-curing, and welding.

4. The system of claim 3, wherein the first component and second component are configured to form an aircraft water collector.

5. The system of claim 1, wherein the second component further comprises a second wedge portion defined in the outer surface, the second wedge portion defined by a linearly non-uniform diameter and axially aligned with the first wedge portion of the first component to form a contiguous wedge structure, wherein the ring includes a generally complementary inner diameter profile configured to interface with the contiguous wedge structure to provide contact pressure to the joint.

6. The system of claim 1, wherein the second component further includes a second wedge portion defined in the outer surface thereof, the second wedge portion defined by a linearly non-uniform diameter and facing opposite the first wedge portion to form a peak therebetween, wherein the ring includes first ring portion having a complementary inner diameter profile configured to interface with the first wedge portion and a second ring portion having a complementary inner diameter profile configured to interface with the second wedge portion, the first and second ring portions configured to meet at the peak to provide contact pressure to the joint.

7. The system of claim 1, wherein the angle a between the respective tooth axis and first axis and between the respective tooth axis and the second axis constant along a length of a respective tooth.

8. The system of claim 1, wherein the angle a between the respective tooth axis and first axis and between the respective tooth axis and the second axis is variable along a length of a respective tooth.

9. The system of claim 1, wherein each tooth has a thickness equal to or less than a thickness of the respective first component and second component and a width that is uniform along the respective tooth axis from a base of the tooth to a tip of the tooth.

10. The system of claim 1, wherein a geometry of each tooth is non-uniform along the respective tooth axis from a base of the tooth to a tip of the tooth.

11. The system of claim 1, wherein each tooth of the first plurality of teeth is defined through an entire radial thickness of the first component and each tooth of the second plurality of teeth is defined through an entire radial thickness of the second component.

12. The system of claim 1, wherein each tooth of the first plurality of teeth is defined through a portion of a radial thickness of the first component and each tooth of the second plurality of teeth is defined through a portion of a radial thickness of the second component.

13. A method of forming a component, comprising, forming a first polymer-based tubular component defining a first axis and having a first plurality of teeth defined in a first free end thereof, each tooth extending along a respective tooth axis angled oblique to the first axis by an angle α;
forming a second polymer-based tubular component defining a second axis and having a second plurality of teeth defined in a second free end thereof, each tooth extending along a respective tooth axis angled oblique to the second axis by the angle α, the second plurality of teeth complementary to the first plurality of teeth;
engaging the first plurality of teeth with the second plurality of teeth to join the first component and the second component coaxially to form a joint therebetween such that, when engaged, the first component and second component remain engaged under tensile axial load; and
installing a ring on an outer surface of a portion of the first component and the second component at the joint to provide contact pressure to the joint;
wherein installing the ring includes installing the ring on a wedge structure defined on at least one of the first and or second component.

14. The method of claim 13, wherein installing the ring includes thermally shrinking the first and second components before installing the ring and allowing the first and second components to thermally expand into the ring such that the ring provides contact pressure to the joint.

15. The method of claim 13, wherein installing the ring includes installing a first ring portion over a first wedge structure defined in the first component and a second ring portion over a second wedge structure defined on the second component.

16. A method, comprising, forming a first tubular component defining a first axis and having a first plurality of teeth defined in a first free end thereof, each tooth extending along a respective tooth axis angled oblique to the first axis by an angle α;
forming a second tubular component defining a second axis and having a second plurality of teeth defined in a second free end thereof, each tooth extending along a respective tooth axis angled oblique to the second axis by the angle α, the second plurality of teeth complementary to the first plurality of teeth;
engaging contact surfaces of the first plurality of teeth with contact surfaces of the second plurality of teeth to join the first component and the second component coaxially to form a joint therebetween such that, when engaged, the first component and second component remain engaged under tensile axial load; and
installing a ring on an outer surface of a portion of the first component and the second component at the joint to provide contact pressure to the joint, wherein installing the ring includes thermally shrinking the first and second components before installing the ring and allowing the first and second components to thermally expand into the ring such that the ring provides contact pressure to the joint.

\* \* \* \* \*